(12) United States Patent
Mantor et al.

(10) Patent No.: US 8,675,003 B2
(45) Date of Patent: Mar. 18, 2014

(54) EFFICIENT DATA ACCESS FOR UNIFIED PIXEL INTERPOLATION

(75) Inventors: Michael Mantor, Orlando, FL (US); Michael Mang, Oviedo, FL (US); Karl Mann, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 685 days.

(21) Appl. No.: 12/730,386

(22) Filed: Mar. 24, 2010

(65) Prior Publication Data

US 2011/0057942 A1    Mar. 10, 2011

Related U.S. Application Data

(60) Provisional application No. 61/240,926, filed on Sep. 9, 2009.

(51) Int. Cl.
*G06T 15/50* (2011.01)
*G09G 5/39* (2006.01)
*G06F 13/372* (2006.01)
*G06F 15/167* (2006.01)

(52) U.S. Cl.
USPC ........... 345/530; 345/426; 345/531; 345/534; 345/541

(58) Field of Classification Search
USPC .......................................... 345/426, 530–541
See application file for complete search history.

(56) References Cited

U.S. PATENT DOCUMENTS

| | | | | |
|---|---|---|---|---|
| 6,232,981 B1 * | 5/2001 | Gossett | | 345/582 |
| 2003/0126577 A1 * | 7/2003 | Elzinga | | 716/12 |
| 2003/0210248 A1 * | 11/2003 | Wyatt | | 345/541 |
| 2008/0079744 A1 * | 4/2008 | Xu et al. | | 345/552 |
| 2009/0073168 A1 * | 3/2009 | Jiao et al. | | 345/426 |

* cited by examiner

*Primary Examiner* — Xiao M. Wu
*Assistant Examiner* — Matthew D Salvucci
(74) *Attorney, Agent, or Firm* — Sterne, Kessler, Goldstein & Fox P.L.L.C.

(57) ABSTRACT

Disclosed herein are methods, apparatuses, and systems for accessing vertex data stored in a memory, and applications thereof. Such a method includes writing vertex data of primitives into contiguous banks of a memory such that the vertex data of consecutively written primitives spans more than one row of the memory. Vertex data of two consecutively written primitives are read from the memory in a single clock cycle.

16 Claims, 7 Drawing Sheets

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | $T_0^{(0,x)}$ | $T_0^{(0,y)}$ | $T_0^{(0,z)}$ | $T_0^{(0,w)}$ | $T_0^{(1,x)}$ | $T_0^{(1,y)}$ | $T_0^{(1,z)}$ | $T_0^{(1,w)}$ | $T_0^{(2,x)}$ | $T_0^{(2,y)}$ | $T_0^{(2,z)}$ | $T_0^{(2,w)}$ | $T_1^{(0,z)}$ | $T_1^{(0,w)}$ | $T_1^{(0,x)}$ | $T_1^{(0,y)}$ |
| 2 | $T_1^{(1,z)}$ | $T_1^{(1,w)}$ | $T_1^{(1,x)}$ | $T_1^{(1,y)}$ | $T_1^{(2,z)}$ | $T_1^{(2,w)}$ | $T_1^{(2,x)}$ | $T_1^{(2,y)}$ | $T_2^{(0,x)}$ | $T_2^{(0,y)}$ | $T_2^{(0,z)}$ | $T_2^{(0,w)}$ | $T_2^{(1,x)}$ | $T_2^{(1,y)}$ | $T_2^{(1,z)}$ | $T_2^{(1,w)}$ |
| 3 | $T_2^{(2,x)}$ | $T_2^{(2,y)}$ | $T_2^{(2,z)}$ | $T_2^{(2,w)}$ | $T_3^{(0,z)}$ | $T_3^{(0,w)}$ | $T_3^{(0,x)}$ | $T_3^{(0,y)}$ | $T_3^{(0,z)}$ | $T_3^{(1,w)}$ | $T_3^{(1,x)}$ | $T_3^{(1,y)}$ | $T_3^{(2,z)}$ | $T_3^{(2,w)}$ | $T_3^{(2,x)}$ | $T_3^{(2,y)}$ |

312

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | $T_0^{(0,x)}$ | $T_0^{(0,y)}$ | $T_0^{(0,z)}$ | $T_0^{(0,w)}$ | $T_0^{(1,x)}$ | $T_0^{(1,y)}$ | $T_0^{(1,z)}$ | $T_0^{(1,w)}$ | $T_0^{(2,x)}$ | $T_0^{(2,y)}$ | $T_0^{(2,z)}$ | $T_0^{(2,w)}$ | $T_1^{(0,z)}$ | $T_1^{(0,w)}$ | $T_1^{(0,x)}$ | $T_1^{(0,y)}$ |
| 2 | $T_1^{(1,z)}$ | $T_1^{(1,w)}$ | $T_1^{(1,x)}$ | $T_1^{(1,y)}$ | $T_1^{(2,z)}$ | $T_1^{(2,w)}$ | $T_1^{(2,x)}$ | $T_1^{(2,y)}$ | $T_2^{(0,x)}$ | $T_2^{(0,y)}$ | $T_2^{(0,z)}$ | $T_2^{(0,w)}$ | $T_2^{(1,x)}$ | $T_2^{(1,y)}$ | $T_2^{(1,z)}$ | $T_2^{(1,w)}$ |
| 3 | $T_2^{(2,x)}$ | $T_2^{(2,y)}$ | $T_2^{(2,z)}$ | $T_2^{(2,w)}$ | $T_3^{(0,z)}$ | $T_3^{(0,w)}$ | $T_3^{(0,x)}$ | $T_3^{(0,y)}$ | $T_3^{(0,z)}$ | $T_3^{(1,w)}$ | $T_3^{(1,x)}$ | $T_3^{(1,y)}$ | $T_3^{(2,z)}$ | $T_3^{(2,w)}$ | $T_3^{(2,x)}$ | $T_3^{(2,y)}$ |

EFFICIENT DATA ACCESS FOR UNIFIED PIXEL INTERPOLATION

CROSS REFERENCE TO RELATED APPLICATIONS

This application claims benefit under 35 U.S.C. §119(e) to U.S. Provisional Patent Application No. 61/240,926, entitled "Efficient Data Access for Unified Pixel Interpolation," to Mantor et al., filed Sep. 9, 2009, the entirety of which is hereby incorporated by reference as if fully set forth herein.

BACKGROUND

1. Field of the Invention

The present invention is generally directed to computing operations performed in computer systems. More particularly, the present invention is directed to a processor such as, for example, a graphics processing unit (GPU), that performs computing operations and applications thereof.

2. Background Art

A GPU is a complex integrated circuit that is specially designed to perform data-parallel computing tasks, such as graphics-processing tasks. A GPU may, for example, execute graphics-processing tasks required by an end-user application, such as a video-game application. The GPU may be a discrete (i.e., separate) device and/or package or may be included in the same device and/or package as another processor (e.g., a CPU). For example, GPUs are frequently integrated into routing or bridge devices such as, for example, Northbridge devices.

Several layers of software exist between an end-user application and a GPU. The end-user application communicates with an application-programming interface (API). An API allows the end-user application to output graphics data and commands in a standardized format, rather than in a format that is dependent on the GPU. The API communicates with a driver. The driver translates standard code received from the API into a native format of instructions understood by the GPU. The driver is typically written by the manufacturer of the GPU. The GPU then executes the instructions received from the driver.

To complete a graphics-processing task, a GPU typically executes a plurality of shader programs ("shaders"), including a vertex shader, a geometry shader, and a pixel shader. In the past, a GPU may have included a plurality of engines, wherein each engine was configured to implement one of the shaders. More recently, APIs have moved to a unified shader model in which a single processing engine ("shader core") of a GPU implements each of the shader programs. Unfortunately, conventional GPUs may not be configured to efficiently implement a unified shader model from a hardware perspective.

What is needed, therefore, is a GPU that efficiently implements the unified shader model from a hardware perspective.

SUMMARY OF EMBODIMENTS OF THE INVENTION

Embodiments of the present invention meet the above-described needs by providing methods, apparatuses, and systems that enable efficient data access for unified pixel interpolation.

For example, an embodiment of the present invention provides a method for accessing vertex data stored in a memory, and applications thereof. This method includes writing vertex data of primitives into contiguous banks of a memory such that the vertex data of consecutively written primitives spans more than one row of the memory. Vertex data of two consecutively written primitives are read from the memory in a single clock cycle.

Another embodiment of the present invention provides a processing unit, including an arithmetic logic unit (ALU) and a local memory coupled to the ALU. Vertex data of primitives are written into contiguous banks of the local memory such that the vertex data of consecutively written primitives spans more than one row of the local memory. Vertex data of two consecutively written primitives are read from the local memory in a single clock cycle.

A further embodiment of the present invention provides a computing system, including a system memory, a processing unit, and a bus coupled to the system memory and the processing unit. The processing unit includes an ALU and a local memory coupled to the ALU. Vertex data of primitives are written into contiguous banks of the local memory such that the vertex data of consecutively written primitives spans more than one row of the local memory. Vertex data of two consecutively written primitives are read from the local memory in a single clock cycle.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 5 illustrates how data is written into banks of memory of a local data share for efficient access of the data during pixel interpolation in accordance with an embodiment of the present invention.

Figure 1:
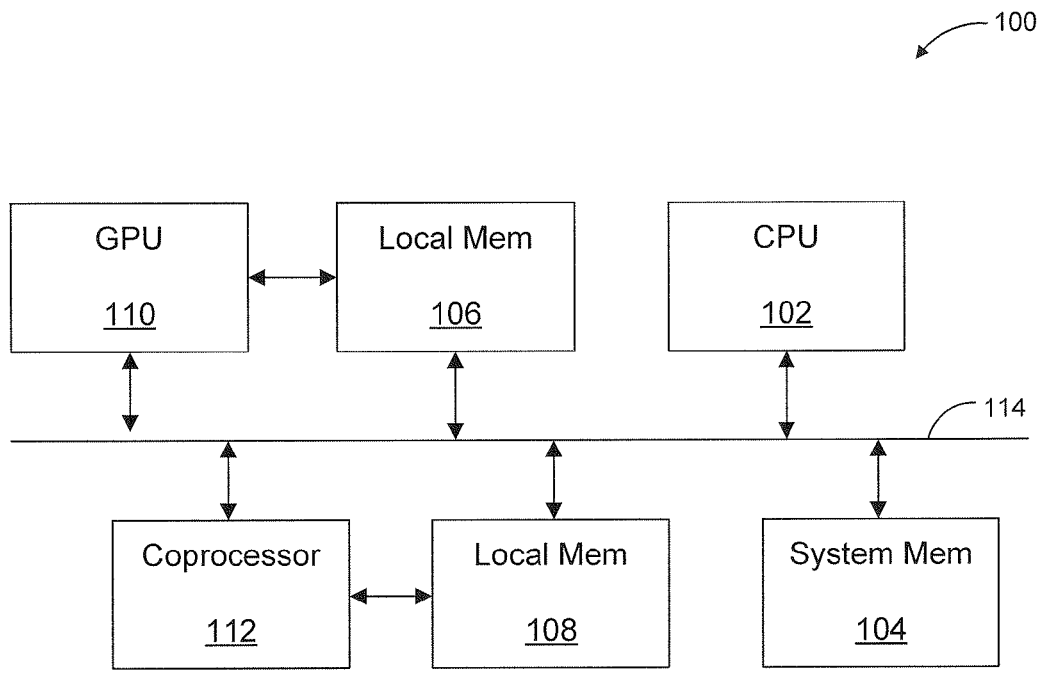
FIG. 1 is a block diagram of an example computer system in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structur-

DETAILED DESCRIPTION

I. Overview

Embodiments of the present invention are directed to efficiently accessing data for unified pixel interpolation, and applications thereof. In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily retelling to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An embodiment of the present invention is directed to efficiently accessing data for unified pixel interpolation. In graphics processing, pixels are interpolated from primitive data. Primitive data, or simply a primitive, typically includes three vertices, although a primitive may include four or more vertices. Each primitive is associated with one or more attributes. An attribute describes a characteristic of a primitive—such as, for example, spatial location, color, texture addresses, barycentric coordinates, weights, etc. Each attribute is associated with a vector comprising a plurality of values. In an embodiment, an attribute is associated with a minimum of four values. For example, in the context of pixel interpolation, each vertex may be associated with four values—labeled x, y, z, and w. So, a typical single primitive is associated with twelve vertex values (i.e., 3 vertices*4 values per vertex=12).

As alluded to above, the values x, y, z, and w may be associated with a spatial location, a color, a texture address, barycentric coordinates, weights, or some other characteristic. For illustrative purposes, and not limitation, the values x, y, z, and w will be described below in terms of spatial location. But it will be appreciated by persons skilled in the relevant art(s) that the x, y, z, and w values may be associated with other types of attributes.

The minimum of twelve vertex values for each primitive are written into a memory that stages the data for loading into an arithmetic logic unit (ALU). In an embodiment, this memory includes sixteen banks, wherein each bank has only one read port. In other embodiments, however, the memory may have greater or fewer numbers of banks. Due to the type of processing performed, it is desirable to read data from two different primitives in a single clock cycle. Because the number of pieces of primitive data may not equal the number of banks of memory (e.g., there may be 12 pieces of primitive data and 16 banks of memory), the primitive data for two different primitives may spans two different rows of the memory. Accordingly, if the data for each primitive is written into the memory in the same order (e.g., x, y, z, w), the data will align in the memory in such a way that the desired data from the two primitives cannot be read out of the memory in a single clock cycle.

One possible solution would be to have two read ports on each bank. Another possible solution would be to increase the number of banks. But each of these solutions would require more area and, therefore, are not desirable.

To address this problem, an embodiment of the invention is directed to writing data of even primitives (e.g., triangles) in a normal order (e.g., x, y, z, w) and writing data of odd primitives (e.g., triangles) in a swizzled order (e.g., z, w, x, y). Alternatively, vertex data of odd primitives could be written in normal order, and vertex data of even primitives could be written in swizzled order. Either way, the data in the memory is aligned such that the desired data from two different primitives can be read from the memory in a single clock cycle.

For illustrative purposes only, and not limitation, embodiments of the present invention will be described herein in terms of a GPU. A person skill in the relevant art(s) will appreciate, however, that embodiments of the present invention include other types of processing units, such as central processing units and coprocessors, that implement a unified shader model and that read and write data to a local memory, wherein the local memory is associated with processing resources (e.g., arithmetic logic units (ALUs)) of the processing units. These other types of processors are contemplated within the spirit and scope of the present invention.

Further details of an example GPU in accordance with an embodiment of the present invention are described below. Before providing these details, however, it is helpful to describe an example system in which such a GPU may be implemented.

II. An Example System

FIG. 1 is a block diagram of a computing system 100 according to an embodiment. Computing system 100 includes a CPU 102, a GPU 110, and may optionally include a coprocessor 112. In the embodiment of FIG. 1, CPU 102 and GPU 110 are illustrated as separate processing units. In alternative embodiments, however, the functionality of CPU 102 and GPU 110 may be integrated into a single processing unit. That is, CPU 102 and GPU 110 may be implemented in a single integrated chip or package.

Computing system 100 also includes a system memory 104 that may be accessed by CPU 102, GPU 110, and coprocessor 112. In embodiments, computing system 100 may comprise a supercomputer, a desktop computer, a laptop computer, a video-game console, an embedded device, a handheld device (e.g., a mobile telephone, smart phone, MP3 player, a camera, a GPS device, or the like), or some other device that includes or is configured to include a processing unit (such as, CPU 102 and/or GPU 110).

GPU 110 assists CPU 102 by performing certain special functions (such as, graphics-processing tasks and data-parallel, general-compute tasks), usually faster than CPU 102 could perform them in software. In embodiments, GPU 110 may be integrated into a chipset and/or CPU 102. Additional details of GPU 110 are provided below.

Coprocessor 112 also assists CPU 102. Coprocessor 112 may comprise, but is not limited to, a floating point coprocessor, a GPU, a video processing unit (VPU), a networking coprocessor, and other types of coprocessors and processors as would be apparent to a person skilled in the relevant art(s).

GPU 110 and coprocessor 112 communicate with CPU 102 and the system memory over a bus 114. Bus 114 may be any type of bus used in computer systems, including a peripheral component interface (PCI) bus, an accelerated graphics port (AGP) bus, a PCI Express (PCIE) bus, or another type of bus for coupling functional blocks, whether presently available or developed in the future.

In addition to system memory 104, computing system 100 further includes local memory 106 and local memory 108. Local memory 106 is coupled to GPU 110 and may also be coupled to bus 114. Local memory 108 is coupled to coprocessor 112 and may also be coupled to bus 114. Local memories 106 and 108 are available to GPU 110 and coprocessor 112 respectively in order to provide faster access to certain data (such as data that is frequently used) than would be possible if the data were stored in system memory 104. In embodiments, local memories 106 and 108 are incorporated with GPU 110 and coprocessor 112, respectively. Local memories 106 and 108 include a plurality of banks of memory (e.g., 16 banks of memory).

In an embodiment, GPU 110 and coprocessor 112 decode instructions in parallel with CPU 102 and execute only those instructions intended for them. In another embodiment, CPU 102 sends instructions intended for GPU 110 and coprocessor 112 to respective command buffers.

Although not specifically illustrated in FIG. 1, computing system 100 may also include or be coupled to a display device (e.g., cathode-ray tube, liquid crystal display, plasma display, or the like). The display device is used to display content to a user (such as, when computing system 100 comprises a computer, video-game console, or handheld device).

III. An Example GPU

Figure 2:
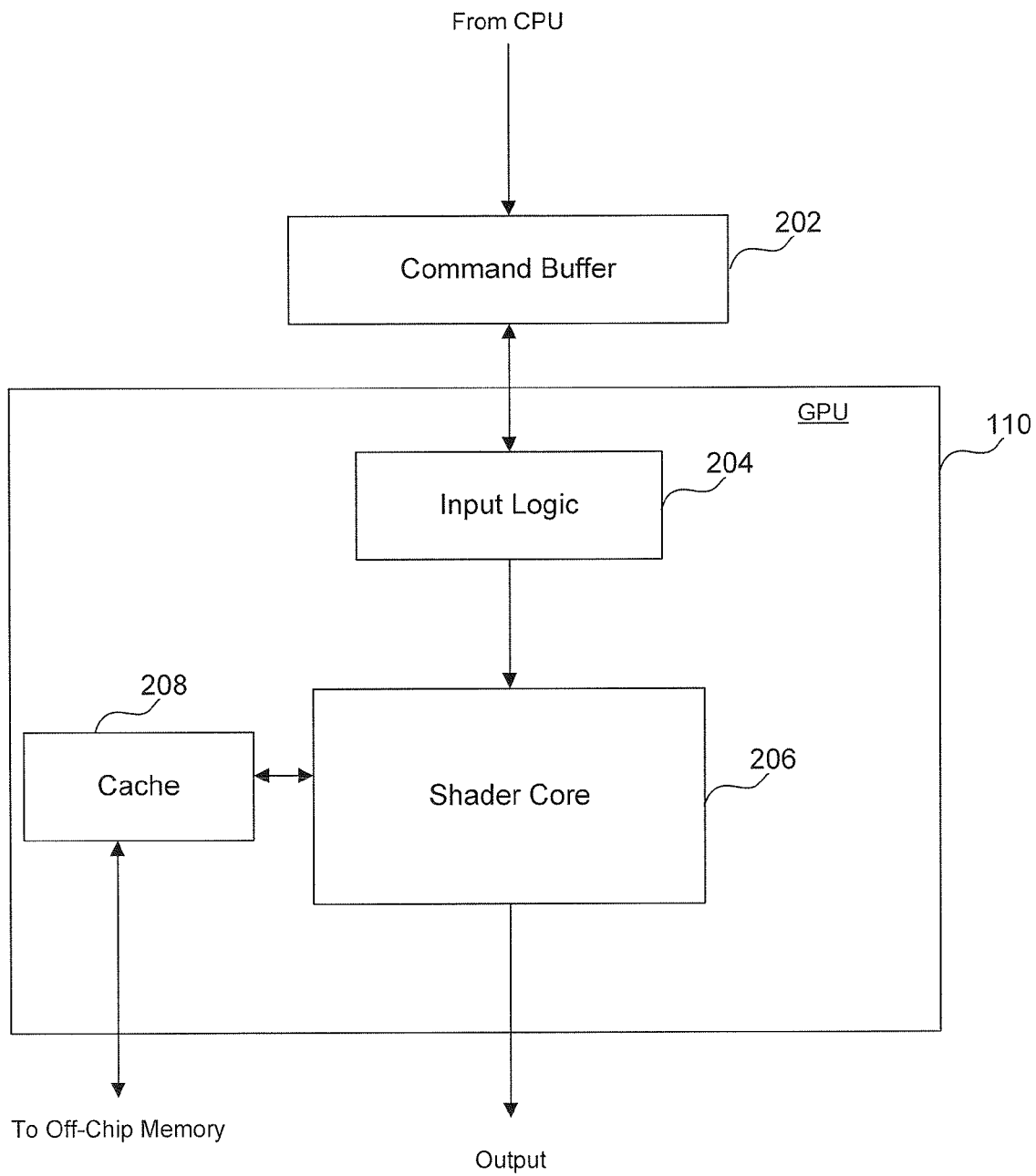
FIG. 2 is a block diagram of an example GPU in accordance with an embodiment of the present invention.
Figure 3:
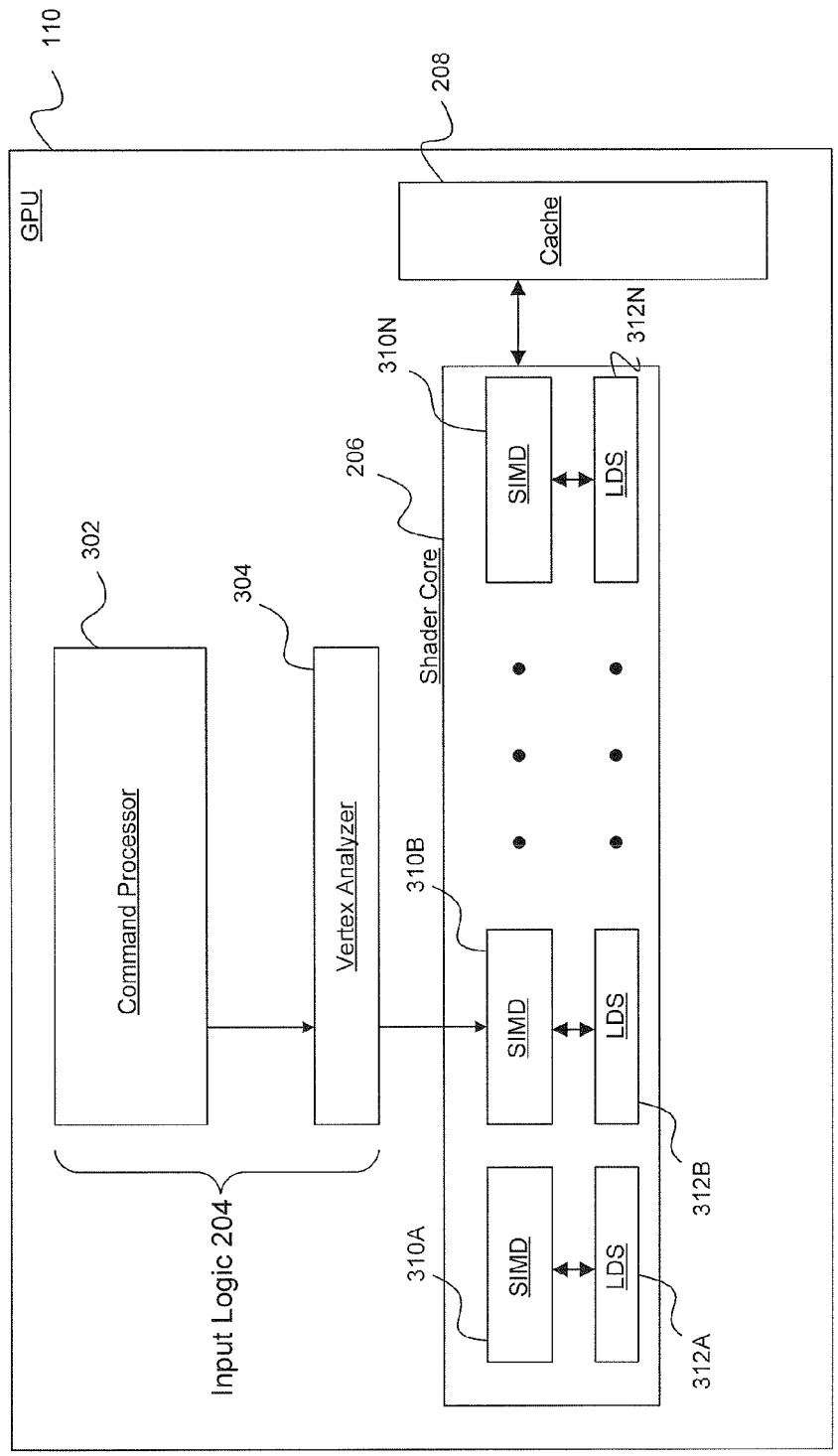
FIG. 3 is a block diagram of additional details of the GPU of FIG. 2.

FIGS. 2 and 3 are block diagrams of an example GPU 110 in accordance with an embodiment of the present invention. As shown in the embodiment of FIG. 2, GPU 110 is coupled to a command buffer 202 and includes input logic 204, a shader core 206, and a cache 208.

Input logic 204 performs pre-processing on the graphics-processing tasks and general-compute tasks. As illustrated in FIG. 3, input logic 204 may include a command processor 302 and a vertex analyzer 304.

Command processor 302 receives the tasks to be executed by GPU 110. Command processor 302 then passes the tasks to vertex analyzer 304.

Vertex analyzer 304 identifies all the shader programs associated with a graphics-processing and/or general-compute task, and schedules when each shader program can be launched in shader core 206 based on input and output data that will be available. For example, a particular graphics-processing task may require the execution of a first shader program and a second shader program, wherein the second shader program is dependent on data generated by the first shader program. In accordance with this example, vertex analyzer 304 identifies the first and second shader programs and schedules the first shader program to be executed before the second shader program, so that the data for the second shader program will be available when the second shader program is launched. After pre-processing the graphics-processing and general-compute tasks, vertex analyzer 304 issues these tasks to shader core 206.

Shader core 206 includes a plurality of compute resources (e.g., ALUs). The tasks to be executed by shader core 206 may be broken up into a plurality of work loads, wherein work loads may be issued to different compute resources (e.g., ALUs) in parallel. Input logic 204 keeps track of which workloads are processed by the different compute resources (e.g., ALUs) within shader core 206, enabling a plurality of threads to execute in parallel. In an embodiment, for example, more than 30,000 threads may execute in shader core 206 at any one time. The results of the operations of shader core 206 are sent to an output buffer (such as, for example, a frame buffer). The output buffer may be included on the same chip as GPU 110 or may be included in an off-chip memory.

Cache 208 stores data that is frequently used by shader core 206. When data is needed by shader core 206 to execute a shader program, first a request is made to cache 208. If there is a cache hit in cache 208 (i.e., the requested data is in cache 208), the data is forwarded to shader core 206. If there is a cache miss in cache 208 (i.e., the requested data is not in cache 208), the request data is retrieved from off-chip memory. In an embodiment, cache 208 comprises one or more level 1 (L1) caches and one or more level 2 (L2) caches, wherein the L1 caches have less storage capacity but provide faster data access than the L2 caches.

In a unified shader model, GPU 110 executes a sequence of shaders. To execute the shaders, each compute resource (e.g., ALU) of GPU 110 may comprise a single-instruction multiple-data (SIMD) unit. For example, FIG. 3 illustrates that GPU 110 includes a plurality of SIMDs 310A through 310N. Each SIMD 310 is associated with its own local data store (LDS) 312. In an embodiment, each LDS 312 has sixteen banks. The specific sequence of shaders that GPU 110 executes is dictated by an API to which GPU 110 is coupled. In a typical sequence, GPU 110 executes a vertex shader, a geometry shader, and a pixel shader. Prior to execution of the pixel shader, vertex data is written into an LDS 312 associated with a SIMD 310 that is to perform operations of the pixel shader. As described in more detail below, each primitive (e.g., triangle) of vertex data may be associated with twelve data entries, whereas, in an embodiment, each LDS 312 has sixteen banks of memory. As a result, the vertex data of two successive primitives (e.g., triangles) may span across two different rows of a given LDS 312. In accordance with an embodiment of the present invention, the vertex data for even primitives (or odd primitives) is written into an LDS 312 in normal order; whereas the vertex data for odd primitives (or even primitives) is written into the LDS 312 in a swizzled order. As a result, the vertex data for two consecutive primitives can be read out of memory in a single clock cycle.

Figure 4:
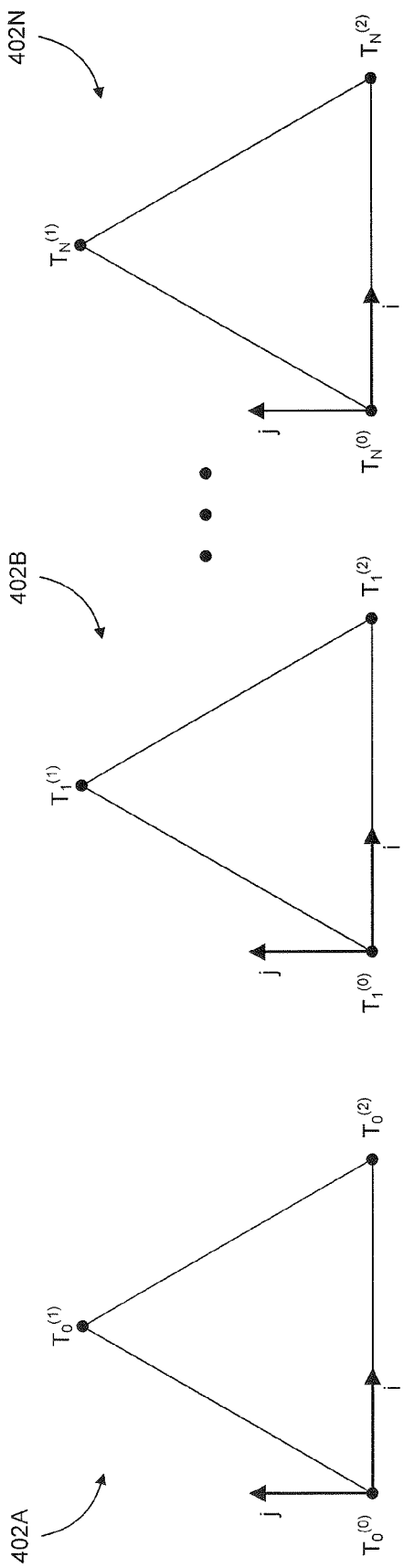
FIG. 4 illustrates a successive stream of primitives (triangles) that may be processed during pixel interpolation in accordance with an embodiment of the present invention.

FIG. 4 illustrates a plurality of triangles 402A-N, including vertex data to be processed during pixel interpolation. Referring to FIG. 4, each triangle 402 includes three vertices. The vertices of each triangle are specified by a superscript numeral within parentheses. A subscript is also included to label the triangle number. So, for example, the first triangle 402A has three vertices—labeled $T_0^{(0)}$, $T_0^{(1)}$, and $T_0^{(2)}$. The subscript (i.e., 0) indicates that these are vertices for first triangle 402A. The superscript indicates a particular vertex of first triangle 402A. In the example of FIG. 4, the bottom left vertex is labeled with a superscript 0; the top vertex is labeled with a superscript 1; and the bottom right vertex is labeled with a superscript 2.

During pixel interpolation, the following calculations may be performed for a k-th pixel, wherein k is a positive integer value:

$$x_k = T_k^{(0,x)} + i * \Delta T_k^{(1-0,x)} + j * \Delta T_k^{(2-0,x)}$$

$$y_k = T_k^{(0,y)} + i * \Delta T_k^{(1-0,y)} + j * \Delta T_k^{(2-0,y)}$$

$$z_k = T_k^{(0,z)} + i * \Delta T_k^{(1-0,z)} + j * \Delta T_k^{(2-0,z)}$$

$$w_k = T_k^{(0,w)} + i * \Delta T_k^{(1-0,w)} + j * \Delta T_k^{(2-0,w)} \quad \text{(Eq. 1)}$$

wherein the variables on the right-hand side correspond to the vertices labeled in FIG. 4. In Equation 1, $\Delta T_k^{(1-0,x)} = T_k^{(1,x)} - T_k^{(0,x)}$ and $\Delta T_k^{(2-0,x)} = T_k^{(2,x)} - T_k^{(0,x)}$, and corresponding equations hold for the y, z, and w coordinates. Also in Equation 1, the variable i is a unit vector along a first (e.g., horizontal)

direction, and the variable j is a unit vector along a second (e.g., vertical) direction, as illustrated in FIG. 4.

It is desirable for a single SIMD 310 to perform computations on the x and y coordinates of successive triangles (e.g., to compute $x_k$, $y_k$, $x_{k+1}$, and $y_{k+1}$) and for a different SIMD 310 to perform computations on the z and w coordinates of successive triangles (e.g., to compute $z_k$, $w_k$, $z_{k+1}$, and $w_{k+1}$).

To efficiently utilize resources, therefore, it is desirable for each SIMD 310 to be able to read vertex data for a first pair of coordinates of successive triangles in a single clock cycle. For example, it is desirable for each SIMD 310 to be able to read the following twelve pieces of data for the x and y coordinates in a single clock cycle:

$T_k^{(0,x)}$—e.g., the x coordinate of the bottom-left vertex of a first triangle;

$\Delta T_k^{(1-0,x)}$—e.g., a difference between the x coordinates of the top vertex and the bottom-left vertex of the first triangle;

$\Delta T_k^{(2-0,x)}$—e.g., a difference between the x coordinates of the bottom-right vertex and the bottom-left vertex of the first triangle;

$\Delta T_k^{(0,y)}$—e.g., the y coordinate of the bottom-left vertex of the first triangle;

$\Delta T_k^{(1-0,y)}$—e.g., a difference between the y coordinates of the top vertex and the bottom-left vertex of the first triangle;

$\Delta T_k^{(2-0,y)}$—e.g., a difference between the y coordinates of the bottom-right vertex and the bottom-left vertex of the first triangle;

$\Delta T_{k+1}^{(0,x)}$—e.g., the x coordinates of the bottom-left vertex of a next triangle;

$\Delta T_{k+1}^{(1-0,x)}$—e.g., a difference between the x coordinates of the top vertex and the bottom-left vertex of the next triangle;

$\Delta T_{k+1}^{(2-0,x)}$—e.g., a difference between the x coordinates of the bottom-right vertex and the bottom-left vertex of the next triangle;

$\Delta T_{k+1}^{(0,y)}$—e.g., the y coordinates of the bottom-left vertex of the next triangle;

$\Delta T_{k+}^{(1-0,y)}$—e.g., a difference between the y coordinates of the top vertex and the bottom-left vertex of the next triangle; and $\Delta T_{k+1}^{(2-0,y)}$—e.g., a difference between the y coordinates of the bottom-right vertex and the bottom-left vertex of the next triangle.

It is also desirable for each SIMD 310 to be able to read vertex data for a second pair of coordinates of successive triangles in a single clock cycle. For example, it is desirable for each SIMD 310 to be able to read the following twelve pieces of data for the z and w coordinates in a single clock cycle:

$T_k^{(0,z)}$—e.g., the z coordinate of the bottom-left vertex of a first triangle;

$\Delta T_k^{(1-0,z)}$—e.g., a difference between the z coordinates of the top vertex and the bottom-left vertex of the first triangle;

$\Delta T_k^{(2-0,z)}$—e.g., a difference between the z coordinates of the bottom-right vertex and the bottom-left vertex of the first triangle;

$\Delta T_k^{(0,w)}$—e.g., the w coordinate of the bottom-left vertex of the first triangle;

$\Delta T_k^{(1-0,w)}$—e.g., a difference between the w coordinates of the top vertex and the bottom-left vertex of the first triangle;

$\Delta T_k^{(2-0,w)}$—e.g., a difference between the w coordinates of the bottom-right vertex and the bottom-left vertex of the first triangle;

$\Delta T_{k+1}^{(0,z)}$—e.g., the z coordinates of the bottom-left vertex of a next triangle;

$\Delta T_{k+1}^{(1-0,z)}$—e.g., a difference between the z coordinates of the top vertex and the bottom-left vertex of the next triangle;

$\Delta T_{k+1}^{(2-0,z)}$—e.g., a difference between the z coordinates of the bottom-right vertex and the bottom-left vertex of the next triangle;

$\Delta T_{k+1}^{(0,w)}$—e.g., the w coordinates of the bottom-left vertex of the next triangle;

$\Delta T_{k+1}^{(1-0,w)}$—e.g., a difference between the w coordinates of the top vertex and the bottom-left vertex of the next triangle; and $\Delta T_{k+1}^{(2-0,w)}$—e.g., a difference between the w coordinates of the bottom-right vertex and the bottom-left vertex of the next triangle.

To enable data to be efficiently read from an LDS 312 in the manner specified above, vertex data for even primitives is written into an LDS 312 in normal order (e.g., x, y, z, w), and vertex data for odd primitives is written into the LDS 312 is a swizzled order (e.g., z, w, x, y)—as illustrated, for example, in FIG. 5. In this way, vertex data of two successive primitives can be read from memory in a single clock cycle.

In an embodiment, each vertex is associated with more than attribute—i.e., more than one 4-component vector. These vectors may be associated with different attributes—such as, colors, normals, texture addresses, barycentric coordinates, weights, etc.—used during processing of an instruction. In addition, the even and odd nature of the primitives is relative to the group or "wavefront" of primitives that have the same characteristics and state and, as a result, are processed together through the pixel shader as one group. An example stream of data that is stored in memory is illustrated below in Table 1. The example data in Table 1 illustrates that the even/odd nature is reset for each attribute. Also, within a wavefront, the numbering of primitive is the same for each attribute. However, each new wavefront can have a different number of primitives and/or attributes.

TABLE 1

| | |
|---|---|
| WAVE 0 ATTR 0 PRIM 0 | xyzw |
| WAVE 0 ATTR 0 PRIM 1 | zwxy |
| WAVE 0 ATTR 0 PRIM 2 | xyzw |
| WAVE 0 ATTR 1 PRIM 0 | xyzw |
| WAVE 0 ATTR 1 PRIM 1 | zwxy |
| WAVE 0 ATTR 1 PRIM 2 | xyzw |
| WAVE 0 ATTR 2 PRIM 0 | xyzw |
| WAVE 0 ATTR 2 PRIM 1 | zwxy |
| WAVE 0 ATTR 2 PRIM 2 | xyzw |
| WAVE 1 ATTR 0 PRIM 0 | xyzw |
| WAVE 1 ATTR 0 PRIM 1 | zwxy |
| WAVE 1 ATTR 1 PRIM 0 | xyzw |
| WAVE 1 ATTR 1 PRIM 1 | zwxy |
| WAVE 2 ATTR 0 PRIM 0 | xyzw |
| WAVE 2 ATTR 0 PRIM 1 | zwxy |
| WAVE 2 ATTR 0 PRIM 2 | xyzw |
| WAVE 2 ATTR 0 PRIM 3 | zwxy |
| WAVE 2 ATTR 0 PRIM 4 | xyzw |
| WAVE 2 ATTR 1 PRIM 0 | xyzw |
| WAVE 2 ATTR 1 PRIM 1 | zwxy |
| WAVE 2 ATTR 1 PRIM 2 | xyzw |
| WAVE 2 ATTR 1 PRIM 3 | zwxy |
| WAVE 2 ATTR 1 PRIM 4 | xyzw |
| WAVE 2 ATTR 2 PRIM 0 | xyzw |
| WAVE 2 ATTR 2 PRIM 1 | zwxy |
| WAVE 2 ATTR 2 PRIM 2 | xyzw |
| WAVE 2 ATTR 2 PRIM 3 | zwxy |
| WAVE 2 ATTR 2 PRIM 4 | xyzw |

IV. An Example Computing System

Figure 6:
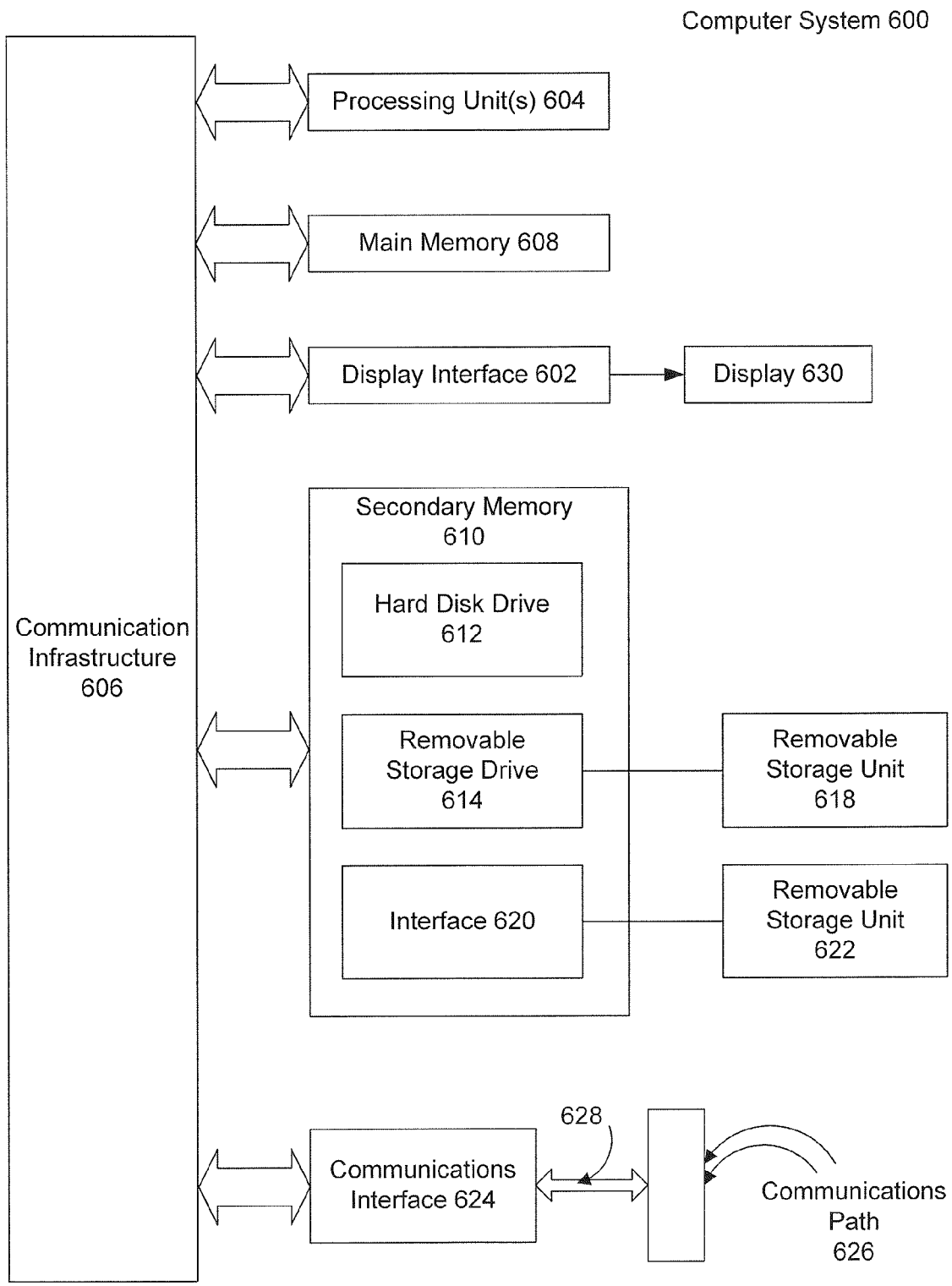
FIG. 6 illustrates an example computing system in accordance with an embodiment of the present invention.

As set forth above, FIG. 1 illustrates an example computing system of an embodiment of the present invention. FIG. 6 illustrates additional components that may be included in an example computing system 600 in accordance with an embodiment of the present invention.

Computing system 600 includes one or more processing units 604. Processing unit(s) 604 may be a general-purpose processing unit (such as, CPU 102 of FIG. 1) or a special-purpose processing unit (such as, GPU 110 of FIG. 1). Processing unit(s) 604 is (are) connected to a communication infrastructure 606 (e.g., a communications bus (such as bus 114 of FIG. 1), a cross-over bar, or a network).

Computing system 600 also includes a display interface 602 that forwards graphics, text, and other data from communication infrastructure 606 (or from a frame buffer not shown) for display on display unit 630 (such as, a liquid crystal display).

Computing system 600 also includes a main memory 608, preferably random access memory (RAM), such as system memory 104 of FIG. 1. In addition, computing system 600 may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618 represents a floppy disk, magnetic tape, optical disk, etc. which is read by and written to by removable storage drive 614. As will be appreciated, the removable storage unit 618 includes a computer-readable storage medium having stored therein computer software and/or data.

In alternative embodiments, secondary memory 610 may include other similar devices for allowing computer programs or other instructions to be loaded into computing system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computing system 600.

Computing system 600 may also include a communications interface 624. Communications interface 624 allows software and data to be transferred between computing system 600 and external devices. Examples of communications interface 624 may include a modem, a network interface (such as an Ethernet card), a communications port, a Personal Computer Memory Card International Association (PCM-CIA) slot and card, etc. Software and data transferred via communications interface 624 are in the form of signals 628 which may be electronic, electromagnetic, optical or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, an radio frequency (RF) link and other communications channels.

In this document, the term "computer-readable storage medium" is used to generally refer to media such as removable storage drive 614 and a hard disk installed in hard disk drive 612. These computer program products provide software to computing system 600.

Computer programs (also referred to as computer control logic) are stored in main memory 608 and/or secondary memory 610. Computer programs may be loaded into computing system 600 using removable storage drive 614, hard drive 612 or communications interface 624. Such computer programs, when executed, enable the computing system 600 to perform the features of the present invention, as discussed herein.

For example, the computer programs, when executed, enable one of processing units 104 to (i) write data to contiguous banks of a local memory such that vertex data of consecutively written primitives spans more than one row of the local memory and (ii) read vertex data of two consecutively written primitives in a single clock cycle. An example of such an operation is described below.

V. Example Operation

Figure 7:
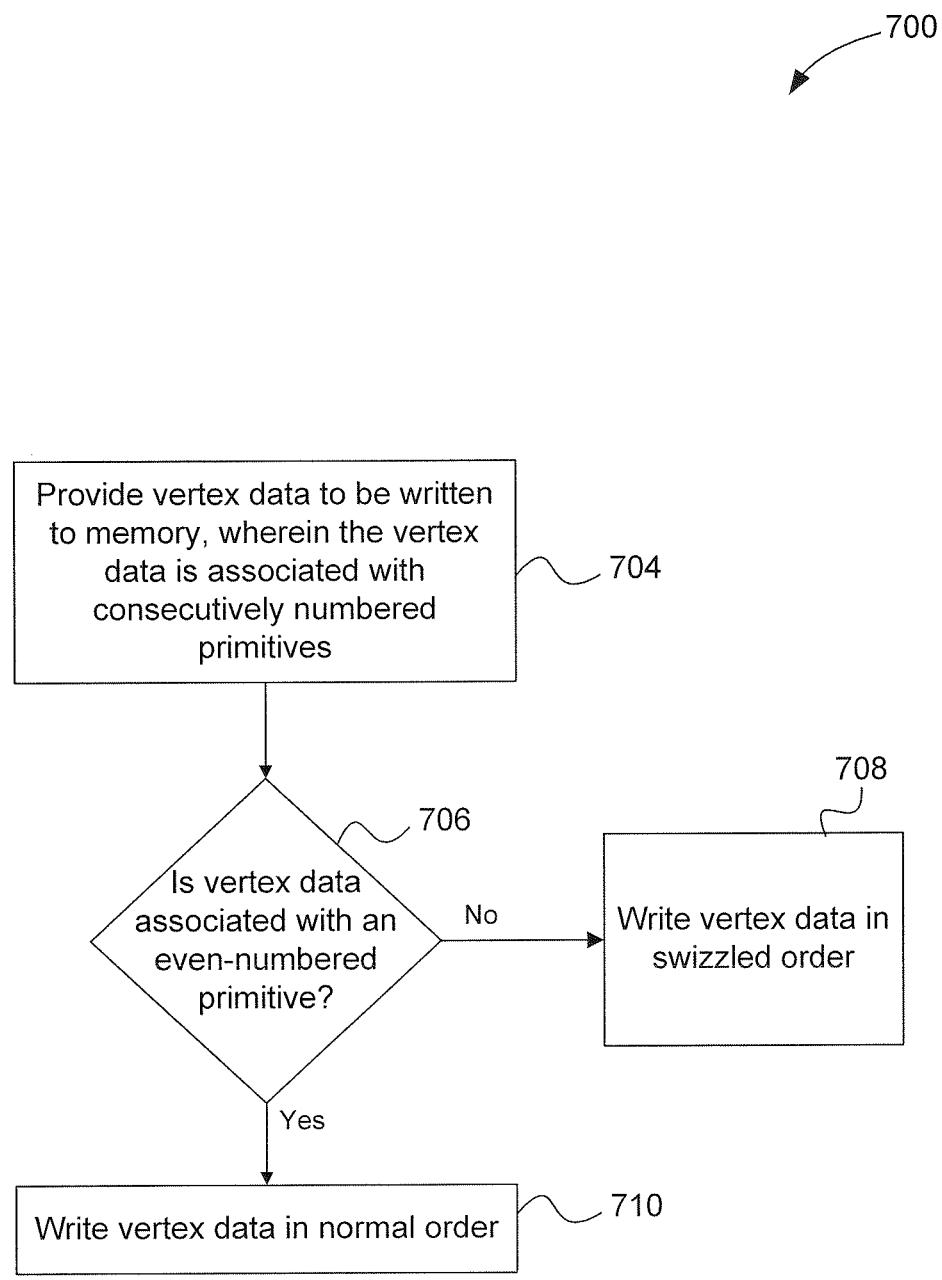
FIG. 7 is a flowchart illustrating an example method for writing data to memory in accordance with an embodiment of the present invention.

FIG. 7 is a flowchart illustrating an example method 700 that may be implemented by a processing unit in accordance with an embodiment of the present invention. Method 700 begins at a step 704 in which vertex data is provided. In an embodiment, the vertex data is associated with consecutively numbered primitives, as illustrated, for example, in FIG. 4. That is, the primitives may be numbered based on the order that they are provided during execution of a shader program (such as, a vertex shader).

In step 706, it is determined whether the vertex data is associated with an even-numbered primitive. It is to be appreciated that, in alternative embodiments, it may be determined whether the vertex data is associated with an odd-numbered primitive. That is, the condition checked in step 706 simply distinguishes between two consecutively numbered primitives, which can be done by checking for either even-numbered primitives or odd-numbered primitives, as is readily apparent to a person skilled in the relevant art(s). For illustrative purposes, and not limitation, only the even-numbered embodiment is described below. However, the odd-numbered embodiment is contemplated within the spirit and scope of the present invention.

If the vertex data is not associated with an even-numbered primitive, then the vertex data is written in swizzled order, as illustrated in a step 708. For example, if each vertex is associated with four values—labeled x, y, z, w—then, in accordance with step 708, the vertex data of each odd-numbered primitive is written into memory such that the z and w values precede the x and y values, i.e., z, w, x, y. In the embodiment of FIG. 5, the vertex data associated with triangles $T_1$ and $T_3$ are written into memory in swizzled order, as can be seen, for example, by examining the data entries at row 1, columns 13 through 16.

If, on the other hand, the vertex data is associated with an even-numbered primitive, then the vertex data is written in normal order, as illustrated in a step 710. For example, if each vertex is associated with four values—labeled x, y, z, w—then, in accordance with step 710, the vertex data of each even-numbered primitive is written into memory such that the x and y values precede the z and w values, i.e., x, y, z, w. In the embodiment of FIG. 5, the vertex data associated with triangles $T_0$ and $T_2$ are written into memory in normal order, as can be seen, for example, by examining the data entries at row 1, columns 1 through 4.

By writing vertex data into memory in this manner (i.e., by writing vertex data of odd-numbered primitives in swizzled order and writing vertex data of even-numbered primitives in normal order), the vertex data for two consecutively written primitives can be read from memory in a single clock cycle, as described in detail above (for example, with respect to FIG.

4). Accordingly, this method, if implemented by a processing unit, enables efficient data access for unified pixel interpolation.

VI. Example Software Implementations

FIGS. 1, 2, 3, and 6 illustrate example processing units (e.g., CPU 102 and GPU 110) of embodiments of the present invention. In addition to hardware implementations of these processing units, they may also be embodied in software disposed, for example, in a computer-readable medium configured to store the software (e.g., a computer-readable program code). The program code causes the enablement of embodiments of the present invention, including the following embodiments: (i) the functions of the systems and techniques disclosed herein (such as the implementation of method 700 of FIG. 7); (ii) the fabrication of the systems and techniques disclosed herein (such as, the fabrication of CPU 102 and/or GPU 110); or (iii) a combination of the functions and fabrication of the systems and techniques disclosed herein.

This can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

VII. Conclusion

Presented above are embodiments that enable efficient access of data for unified pixel interpolation, and applications thereof. It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A computer-implemented method for accessing vertex data stored in a memory, comprising:
    accessing a set of vertex data associated with a plurality of primitives;
    writing into contiguous banks of a memory such, that the vertex data of consecutively written primitives share a row of the memory, wherein a first set of coordinates associated with vertex data of the first set of primitives by arranging an order of the first set of coordinates in a normal order and a corresponding second set of coordinates associated with vertex data of the second set of primitives by arranging an order of the corresponding second set of coordinates in a swizzled order; and
    reading vertex data of two different primitives specified by the set of vertex data from the memory in a single clock cycle.

2. The computer-implemented method of claim 1, wherein the consecutively written primitives are numbered consecutively, and wherein the writing comprises:
    writing coordinates of even-numbered primitives in a normal order; and
    writing coordinates of odd-numbered primitives in a swizzled order.

3. The computer-implemented method of claim 2, wherein the reading comprises:
    reading vertex data for first set of coordinates and the second set of coordinates from the memory in a single clock cycle.

4. The computer-implemented method of claim 1, wherein the memory comprises sixteen banks.

5. A processing unit, comprising:
    an arithmetic logic unit (ALU) configured to access a set of vertex data associated with a plurality of primitives; and
    a local memory coupled to the ALU,
        wherein the set of vertex data are configured to be written into contiguous banks of the local memory such that the vertex data of consecutively written primitives share a row of the local memory, wherein a first set of coordinates associated with vertex data of the first set of primitives are written into the local memory by arranging an order of the first set of coordinates in a normal order and a corresponding second set of coordinates associated with vertex data of the second set of primitives are written into the local memory by arranging an order of the corresponding second set of coordinates in a swizzled order, and
        wherein vertex data of two different primitives specified by the set of vertex data are configured to be read from the local memory in a single clock cycle.

6. The processing unit of claim 5, wherein the consecutively written primitives are numbered consecutively, and wherein:
    coordinates of even-numbered primitives are configured to be written into the local memory in a normal order; and
    coordinates of odd-numbered primitives are configured to be written into the local memory in a swizzled order.

7. The processing unit of claim 6, wherein vertex data for the first pair of coordinates and the second set of coordinates are configured to be read from the local memory in a single clock cycle.

8. The processing unit of claim 5, wherein the local memory comprises sixteen banks.

9. A computing system, comprising:
    a system memory;
    a processing unit; and
    a bus coupled to the system memory and the processing unit;
        wherein the processing unit, comprises:
            an arithmetic logic unit (ALU) configured to access a set of vertex data associated with a plurality of primitives; and
            a local memory coupled to the ALU,
                wherein the set of vertex data are configured to be written into contiguous banks of the local memory such that the vertex data of consecutively written primitives share a row of the local memory, wherein a first set of coordinates associated with vertex data of the first set of primitives are written into the local memory by arranging an order of the first set of coordinates in a normal order and a corresponding second set of coordinates associated with vertex data of the second set of primitives are written into the local memory by arranging an order of the corresponding second set of coordinates in a swizzled order, and wherein vertex data of two different primitives specified by the set of vertex data are configured to be read from the local memory in a single clock cycle.

10. The computing system of claim 9, wherein the consecutively written, primitives are numbered consecutively, and wherein:

coordinates of even-numbered primitives are configured to be written into the local memory in a normal order; and coordinates of odd-numbered primitives are configured to be written into the local memory in a swizzled order.

11. The computing, system of claim 10, wherein vertex data for the first pair of coordinates and the second set of coordinates are configured to be read from the local memory in a single clock cycle.

12. The computing system of claim 9, wherein the local memory comprises sixteen banks.

13. A computer-program product comprising a computer-readable storage medium containing instructions that, if executed on a computing device, define a processing unit, wherein the processing unit comprises:

an arithmetic logic unit (ALU) configured to access a set of vertex data associated with a plurality of primitives; and a local memory coupled to the ALU, wherein the set of vertex data are configured to be written into contiguous banks of the local memory such that the vertex data of consecutively written primitives share a row of the local memory, wherein a first set of coordinates associated with vertex data of the first, set of primitives are written into the local memory by arranging an order of the first set of coordinates in a normal order and a corresponding second set of coordinates associated with vertex data of the second set of primitives are written into the local memory by arranging an order of the corresponding second set of coordinates in a swizzled order, and wherein vertex data of two different primitives specified by the set of vertex data are configured to, be read from the local memory in a single clock cycle.

14. The computer-program product of claim 13, wherein the consecutively written primitives are numbered consecutively, and wherein:

coordinates of even-numbered primitives are configured to be written into the local memory in, the normal order; and coordinates of odd-numbered primitives, are configured to be written into the local memory in a swizzled order.

15. The computer-program product of claim 14, wherein vertex data for the first pair of coordinates and the second set of coordinates are configured to be read from the local memory in a single clock cycle.

16. The computer-program product of claim 13, wherein the local memory comprises sixteen banks.

* * * * *

UNITED STATES PATENT AND TRADEMARK OFFICE
CERTIFICATE OF CORRECTION

| | | |
|---|---|---|
| PATENT NO. | : 8,675,003 B2 | Page 1 of 1 |
| APPLICATION NO. | : 12/730386 | |
| DATED | : March 18, 2014 | |
| INVENTOR(S) | : Mantor et al. | |

It is certified that error appears in the above-identified patent and that said Letters Patent is hereby corrected as shown below:

In the Claims:

<u>Column 14</u>

Line 2 please replace "first, set" with --first set--.

<u>Column 14</u>

Line 11 please replace "to, be" with --to be--.

<u>Column 14</u>

Line 17 please replace "in, the" with --in the--.

Signed and Sealed this
Sixteenth Day of September, 2014

Michelle K. Lee
*Deputy Director of the United States Patent and Trademark Office*